Patented July 10, 1945

2,380,198

UNITED STATES PATENT OFFICE 2,380,198

CERAMIC BODIES

Ira E. Sproat, Westport, Conn., assignor to R. T. Vanderbilt Co., Inc., New York, N. Y., a corporation of New York No Drawing. Application November 2, 1943, Serial No. 508,747

4 Claims. (Cl. 106—62)

This invention relates to raw materials for the production of ceramic bodies.

The raw materials of the invention, alone or properly compounded with other ceramic materials, form fired bodies having a very low thermal expansion, and hence a high resistance to thermal shock, and, in many cases, decreased moisture expansion, increased strength, greater freedom from delayed crazing. Among the bodies which are advantageously made with the raw materials of the invention are wall tile and table ware, radiants and walls for gas stoves, heater plates, space heaters, fireplace equipment and the like, as well as vitreous bodies such as china, sanitary ware, electrical porcelain, floor tile and the like. With vitreous ware particularly the use of the raw materials of the invention decreases the maturing point with a decrease in firing cost, and with most of the bodies there is an increase in the firing range, particularly important because ceramic bodies with low thermal expansion heretofore available have uniformly had a very short firing range.

The new materials of the invention are brucite having a particle size of 100 mesh or finer, advantageously of 325 mesh or finer, such that it can be thoroughly admixed with pyrophyllite, and mixtures of brucite having this particle size with ceramic pyrophyllite containing a small amount of alkali in the form of sericite. Whether the brucite is provided as such, or is provided in admixture with pyrophyllite, pyrophyllite containing sericite is used with the brucite in forming the ceramic bodies, being admixed therewith at the time the ceramic body is prepared, or a mixture of the brucite and pyrophyllite being used. Advantageously, the brucite and the pyrophyllite are ground together to form an intimate admixture in which the brucite has a particle size range of 325 mesh and finer. Also, the mixture of brucite and pyrophyllite is advantageously calcined, and the calcined product used in forming the ceramic bodies, as calcination of the mixture seems to give improved products.

In forming the ceramic bodies the brucite and pyrophyllite may be used in various relative proportions. In most ceramic bodies best results are obtained with the use of a mixture containing about 65% of pyrophyllite and 35% of brucite, or using pyrophyllite and brucite in the ceramic mix in these proportions. However, the two may be used in proportions of 4:1 to 2:3.

The pyrophyllite used contains a small amount of alkali, present as sericite. Best results are obtained with a pyrophyllite which contains 1.8 to 2% of alkali oxide, present as sericite, although good results are obtained with pyrophyllites containing from 0.5 to 5.0% alkali, present as sericite, and even more or somewhat less alkali may be in the pyrophyllite.

In most ceramic bodies, the brucite and pyrophyllite, advantageously as a preformed mixture, are compounded with clays, among other reasons to give workability to the body.

In semi-vitreous ware, the brucite and pyrophyllite are substituted for a part of the flint and feldspar in the typical clay-flint-feldspar earthenware bodies. Typical body formulae for earthenware bodies such as wall tile and table ware are shown in the following table, in which the brucite-pyrophyllite mixture contains 35% brucite and 65% pyrophyllite, the pyrophyllite containing 1.8 to 2% of alkali, present as sericite.

| | | | | | | |
|---|---|---|---|---|---|---|
| Flint | 10.0 | | | 20.0 | 10.0 | |
| Feldspar | 2.0 | 2.0 | 2.0 | 6.0 | 6.0 | 4.0 |
| Ball clay | 25.0 | 25.0 | 20.0 | 25.0 | 32.0 | 32.0 | 30.0 |
| Kaolin or China clay | 23.0 | 23.0 | 20.0 | 25.0 | 26.0 | 26.0 | 20.0 |
| Brucite-pyrophyllite | 40.0 | 50.0 | 58.0 | 50.0 | 16.0 | 26.0 | 46.0 |

The foregoing formulae may of course be modified by including other body materials and auxiliary fluxes such as whiting and titanium oxide.

Bodies intended for use such that high resistance to thermal shock is required such as radiants and walls for gas stoves, heater plates for electric stoves, fire place equipment, and the like, are advantageously made from a mixture of brucite and pyrophyllite and clay. A typical body made from 50% of the brucite-pyrophyllite mixture just described, 30% ball clay and 20% Georgia kaolin, when fired to cone 12, has linear thermal expansion of only 0.26% at 1000° C. The thermal expansion of such bodies may be decreased even below this small amount by the addition of small amounts, such as 1–10%, of beryl, willemite or other materials with a similar low thermal expansion.

In vitreous bodies, such as vitreous china, sanitary ware, electrical porcelain, floor tile and the like, the substitution of brucite and pyrophyllite for all or part of the flint or feldspar of the common formulae substantially decreases the thermal expansion and increases the fired strength of the body. Typical formulae are given in the following table, in which the brucite-pyrophyllite mixture is the same as that previously described.

| | | | | | | |
|---|---|---|---|---|---|---|
| Flint | 17.0 | | | 10.0 | | |
| Feldspar | 15.0 | 24.0 | 9.0 | 12.0 | 37.0 | |
| Ball clay | 9.0 | 16.0 | 16.0 | 20.0 | 20.0 | |
| Kaolin or China clay | 34.0 | 30.0 | 30.0 | 30.0 | 30.0 | |
| Brucite-pyrophyllite | 25.0 | 30.0 | 45.0 | 28.0 | 13.0 | 100.0 |

The ceramic bodies prepared through the use of these new raw materials are formed in any of the usual ways, as by casting, dry pressing, extruding or jiggering.

I claim:

1. A comminuted mixture containing about 35% brucite and about 65% pyrophyllite having an alkali content of 0.5 to 5% present as sericite.

2. A calcined comminuted mixture containing about 35% brucite and about 65% pyrophyllite having an alkali content of 0.5 to 5% present as sericite.

3. A mixture of comminuted brucite and comminuted pyrophyllite in a ratio ranging from 1:4 to 3:2, said pyrophyllite containing a small amount of sericite.

4. A calcined mixture of comminuted brucite and comminuted pyrophyllite in a ratio ranging from 1:4 to 3:2, said pyrophyllite containing a small amount of sericite.

IRA ELMER SPROAT.